United States Patent [19]

Fox

[11] Patent Number: 4,850,183
[45] Date of Patent: Jul. 25, 1989

[54] CROP CONDITIONER

[76] Inventor: Martin L. Fox, 304 El Dorado Rd., El Centro, Calif. 92243

[21] Appl. No.: 188,975

[22] Filed: May 2, 1988

[51] Int. Cl.⁴ ............................................ A01D 82/00
[52] U.S. Cl. .................................. 56/16.4; 56/DIG. 1; 241/236
[58] Field of Search ................. 56/16.4, DIG. 1, 192; 241/226, 230–233, 235, 236

[56] References Cited

U.S. PATENT DOCUMENTS

| | | | |
|---|---|---|---|
| 2,511,841 | 6/1950 | Gaterman | 56/192 |
| 2,636,335 | 5/1953 | Whitney | 56/192 |
| 2,711,622 | 6/1955 | Cunningham | 55/118 |
| 2,843,990 | 7/1958 | Coultas | 56/1 |
| 2,906,076 | 9/1959 | McCarty et al. | 56/1 |
| 2,911,780 | 11/1959 | Brady | 56/1 |
| 2,915,869 | 12/1959 | Coultas | 56/1 |
| 2,918,774 | 12/1959 | McCarty | 56/1 |
| 2,918,776 | 12/1959 | Coultas | 56/192 |
| 2,924,927 | 2/1960 | Pristo | 56/1 |
| 2,954,656 | 10/1960 | Koch et al. | 56/1 |
| 2,966,022 | 12/1960 | Getz | 56/1 |
| 2,992,523 | 7/1961 | Oppel | 56/1 |
| 3,014,324 | 12/1961 | McCarty | 56/1 |
| 3,115,737 | 12/1963 | Harrer et al. | 56/1 |
| 3,116,581 | 1/1964 | Corkery | 56/1 |
| 3,146,569 | 9/1964 | Hale et al. | 56/1 |
| 3,412,446 | 11/1968 | Wood | 56/DIG. 1 |
| 3,472,003 | 10/1969 | Case | 56/1 |
| 3,747,310 | 7/1973 | Calder | 56/1 |

Primary Examiner—John Weiss
Attorney, Agent, or Firm—Baker, Maxham, Jester & Meador

[57] ABSTRACT

A crop conditioner for crimping cut crops to enhance rapid drying. The conditioner includes two crimper roller members mounted to a frame. One roller member is radially movable with respect to the other and has a constant bias toward the stationary roller when under load. The conditioner includes a drive mechanism at each end for positive drive of both roller members from both ends. The biasing means permits independent radial motion of each end of the movable roller member.

30 Claims, 2 Drawing Sheets

CROP CONDITIONER

FIELD OF THE INVENTION

This invention relates generally to an apparatus for treating cut crops and more particularly to improved apparatus for crimping and turning such crops for accelerated drying.

BACKGROUND OF THE INVENTION

A number of implements exist for crushing or crimping cut crops such as hay of various stock or stem thicknesses. These implements have a variety of roller arrangements, some of them being relatively flat, some of them having a toothed structure of various tooth configurations and some of them being a combination of toothed and flat surface rolls. The prior art implements also have a variety of upper deflecting plates to assist in fluffing the crimped or crushed crop and a variety of windrowing vanes to gather the crop into a more concentrated windrow.

The drive means for the known devices typically employ a combination of sprockets and flexible chains, some of them driving one roller which in turn drives the engaging mating roller while others provide a chain drive for both rollers. These drive means are normally positioned at one end of the implement so that each driven roll is driven from one end only. One prior art device drives one roll from one end and the other roll from the other end. None of the known previous crop conditioning implements drive any roll from both ends.

One roll normally has an axis which is fixed relative to the implement frame, the other roll being radially movable within defined limits, and being biased toward the fixed roll. The means for biasing the movable roll with respect to the axially stationary roll is typically a coil tension spring. Additionally, a coil tension spring is frequently used to either adjust for different chain length caused by motion of one roll with respect to the other or to maintain chain tension.

Several prior art implements have complex arrangements for maintaining timing between the crimping or crushing rollers.

Substantially all of the known prior art devices are configured as a trailer connected to the draw bar of a tractor and powered by the power takeoff of the tractor. Thus, at the end of each operational pass across a crop field, the conditioner will trail behind the tractor, with the crushing or crimping rolls normally continuing to rotate unless the power takeoff is turned off. Thus, there is a chance for uncontrolled scattering as the tractor turns at the margins of the field. There is also a chance for damage to the implement because the ground is more likely uneven at the field margins and the implement could encounter not only uneven terrain but foreign objects such as limbs, stones or stumps.

Some of the prior art devices have means to maintain the rolls substantially parallel even when the crop is particularly thick at one point between the rolls causing increased separation of them. When this occurs, the thicker portion of the crop will be appropriately crimped or crushed while the thinner crop portion between the rolls may remain untouched and thereby untreated or unconditioned.

SUMMARY OF THE INVENTION

Broadly speaking, this invention provides a highly effective crop conditioner of the crimper type. The structure is designed for high reliability, requiring low maintenance and having means to not only crimp but roll the crop by approximately 180° to thereby facilitate drying. This device is particularly adaptable to the relatively thick stalk Sudan grass.

The means by which this crop conditioner effectuates its intended purposes are pre-timed driving mechanisms in conjunction with meshing toothed rollers of substantially equal diameter. Identical, mirror image driving mechanisms are provided at each end of the crop conditioner of this invention, each being driven by the tractor power takeoff through a gear box positioned on the frame. The drive and the two driven crimper roller sprockets are so arranged with respect to the longitudinal teeth on the crimper rolls that the flexible drive chain, in conjunction with the sprockets, always maintains proper timing so that the teeth on the crimper rollers do not clash nor is improper timing reasonably likely to occur. An adjustable idler sprocket is provided to initially set the desired chain tension and by adjustments over a period of time to account for drive chain stretching. This idler is adjustable from outside or remote from the drive mechanism and can be adjusted when the drive mechanism is operating.

Motion of the movable roll with respect to the axially fixed roll is controlled in such a manner that it is always substantially in the radial direction from the axially fixed roll, rather than having any significant tangential component of motion. This motion is against the biasing action of a leaf spring which provides precisely controlled tension and is pivotally shackled at both ends to enable the motion of the movable roll to be radial only. Means are provided to adjust the position of one end of the shackled leaf spring.

The crop conditioner of this invention is connectable to the three-point hitch of a tractor so that it is liftable. It thus becomes an integral part of the tractor and does not have the characteristics of a trailer or trailed device.

The motion of the movable roll functions independently at each end thereby allowing the roll to move radially but not necessarily always axially parallel with the axially fixed roll to thereby accommodate thicker portions of crop passing between the rolls at different locations therealong.

BRIEF DESCRIPTION OF THE DRAWING

The objects, advantages and features of this invention will be more readily appreciated when read in conjunction with the accompanying drawing, in which.

DESCRIPTION OF THE PREFERRED EMBODIMENTS

Figure 1:
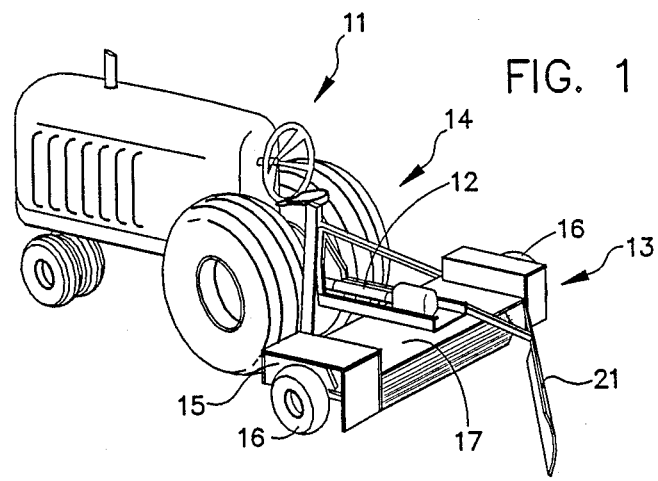
FIG. 1 is a perspective view of this invention from the rear shown in conjunction with a tractor to which it is connected.

With reference now to the drawing and more particularly FIG. 1 thereof, there is shown a typical tractor 11 having a power takeoff shaft 12 coupled to crop conditioner 13 constructed in accordance with the invention. Three point hitch 14 provides direct connection between the crop conditioner and the tractor so that the crop conditioner can be lifted as desired and does not function as a trailed implement.

The crop conditioner has a frame referred to generally by reference numeral 15, wheels 16, upper deflection plate 17 and windrowing mold board 21. The various portions of the invention will be discussed in greater detail with respect to other figures of the drawing.

Figure 2:
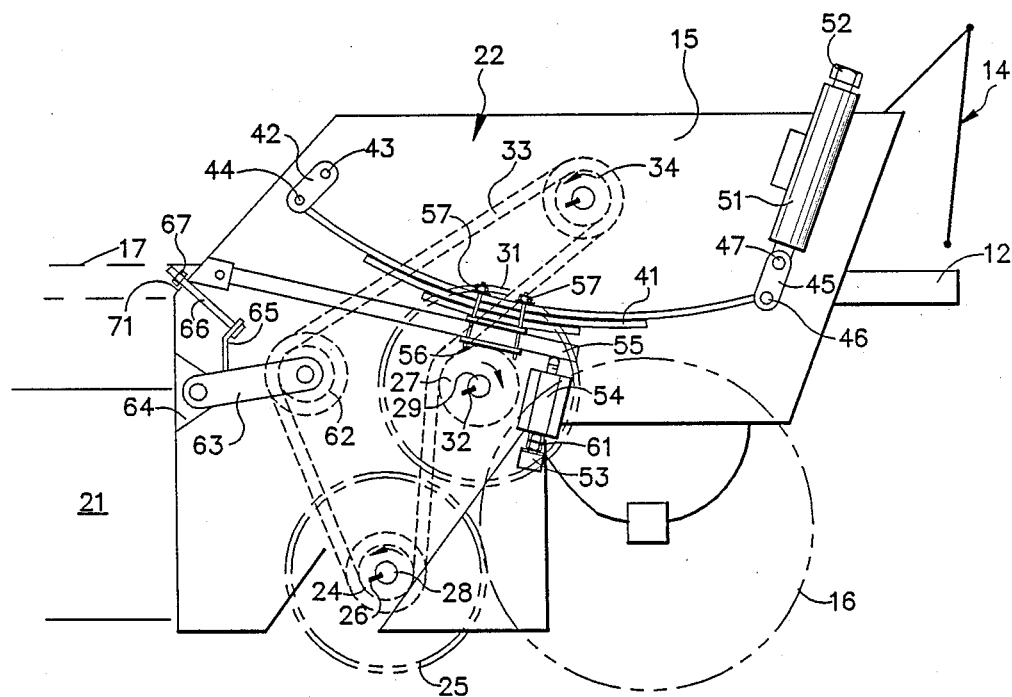
FIG. 2 shows the drive mechanism at the right end of the hay conditioner of this invention.

With reference now to FIG. 2, right end drive mechanism 22 is shown. Drive mechanism 23 on the left end of the crop conditioner is substantially identical but the mirror image of the mechanism shown in FIG. 2. Only one of these will be described in detail. Sprocket 24 on shaft or axle 28 is keyed to toothed roller member 25 by means of key 26. Sprocket 27 on axle 29 is keyed to toothed roller member 31 by means of key 32. The sprockets are so oriented with respect to the surface configuration of the crimper roller members that they always are in timed meshing relationship. For example, key 26 may be aligned with the bottom of a groove between teeth on roller member 25 while key 32 is aligned with the peak of one of the longitudinal teeth on roller member 31. When drive chain 33 engages sprockets 24 and 27, driven by drive sprocket 34, the crimper roller teeth will continue to be properly meshed during operation and for the life of the apparatus.

Figure 3:
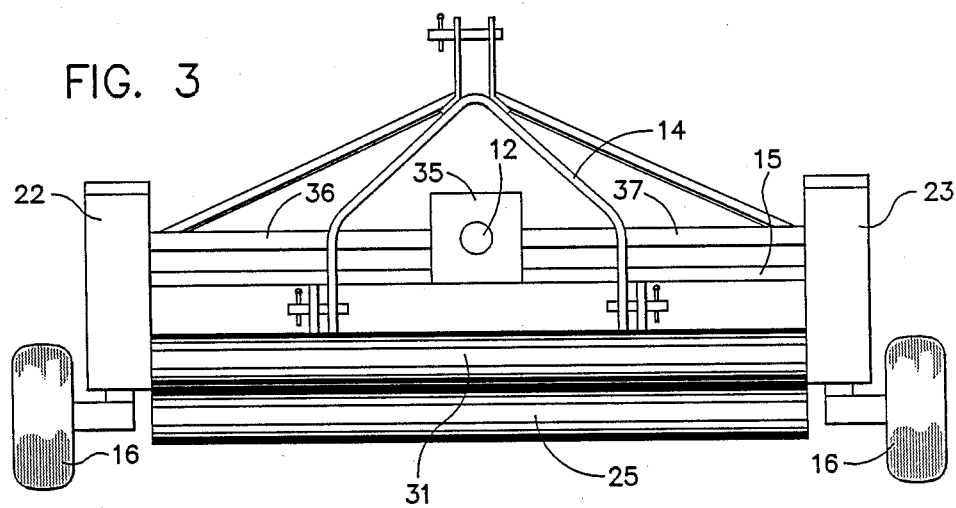
FIG. 3 is an elevational view from the front or tractor side of the hay conditioner.

With reference to FIG. 3 it can be seen that power takeoff shaft 12 is coupled to gear box 35 which in turn drives right shaft 36 and left shaft 37. Sprocket 34 is mounted to shaft 36 and is the drive means for driving chain 33 and sprockets 24 and 27 connected to roller members 25 and 31. Similarly, shaft 37 is connected to a like sprocket and chain (not shown) which are connected to sprockets on the left ends of crimper rollers 25 and 31 to provide equal drive power thereto.

One of the advantages for the dual drive mechanism of the present invention is that there is reduced stress on either drive mechanism. Each roller of the hay conditioner of this invention weighs approximately 450 pounds. Thus 900 pounds of roller is being driven by the tractor power takeoff. By driving both ends, each drive mechanism only drives the equivalent of 450 pounds of crimper roller when in the unloaded condition. The stress on the drive mechanism increases dramatically when crop materials pass between the rollers. Another positive aspect of the dual drive mechanism is that it provides redundancy. Thus, in the unlikely event that something breaks in one of the drive mechanisms, the crop conditioner will not immediately stop but could be continued to be used, at least momentarily, until the implement can be safely raised, moved from the crop area and then repaired. A typical gear box 35 is made to drive from two opposite sides so this invention makes use of the full output of such gear boxes.

When the crop conditioner of this invention is at a standstill or is operating with no load, that is, no crop materials passing between the rollers, there is no tension between the rollers. They are not in physical contact at this time but rotate together in meshing relationship. When the rollers are under load, pressure is applied to roll 31 in a direction away from roll 25 and against the bias of leaf spring arrangement 41. Shackle 42 is provided at one end, pivoted about axis 43 to frame 15 and pivoted about axis 44 to the end of the leaf spring. At the other end of the spring shackle 45 is pivoted about axis 46 to leaf spring 41 and about axis 47 to mounting and adjusting mechanism 51. The adjusting mechanism is primarily provided for factory adjustment of the mechanism to maintain the proper clearance between the crimper rollers. However, bolt 52 may be adjusted in the field for 10 particularly heavy crops or particularly light crops so that proper stress is maintained on leaf spring 41.

Roller stop adjusting pin 53 is threadedly engaged with sleeve 54 mounted to frame 15 and provides a positive stop for arm 55 which is journaled to axle 29 of crimper roller 31. Note that arm 55 connects journal bearing 56 to leaf spring 41 by means of U-bolts 57 in a conventional manner. Stop member pin 53 is adjustable by means of hexagonal nut 61 in conjunction with threaded sleeve 54. This stop mechanism is configured to prevent contacting engagement between the teeth of crimper rollers 25 and 31 and allows for limited additional space between the rollers in the no load condition by raising the downward swing limit of arm 55.

Idler sprocket 62 is rotationally mounted to arm 63 which is pivotally mounted to frame 15 through bracket 64. Member 65 is secured to arm 63 and is formed with a slot through which passes bolt 66. Bolt 66 passes through frame member 71 with nut 67 thereon which is accessible from outside the frame, remote from drive mechanism 22. Thus, the drive mechanism may be operating when chain tension adjustment is made by means of bolt 66 in conjunction with idler sprocket 62 mounted to arm 63.

With respect to the leaf spring arrangement, note that it is possible to maintain positive control of tension or bias on crimper roller 31, a control which is not possible when coil springs are employed. For example, if movable crimper roller 31 encounters a particularly bulky portion of crop, it could drive a coil spring to the fully closed or binding position. If it is driven beyond the coil bind or driven to the binding position frequently, something must eventually break in the biasing mechanism. Further, coil springs do not maintain a constant bias throughout their normal range of motion. By means of the present invention, a leaf spring can vary in its positive rating from 650 to 7000 pounds as contemplated for the present invention. The preferable value for the leaf spring as presently perceived is 3000 pounds. A leaf spring maintains that positive rating throughout its travel and maintains that rating no matter how many times it is stressed. By adding or removing leaves from the leaf spring mechanism, the rating can be changed by a predetermined, measurable amount. The biasing mechanism of crimper roller 31 permits as much as four to five inches of radial movement of the axis of that roller and either end of that roller may move independently. Thus, if a particularly thick amount of the crop is encountered near one end of the rollers, that end would tend to open more than the other end, thereby the crop along the length of the rollers would continue to be crimped as it passes therethrough.

With the mechanism shown, there is an inherently slight amount of motion of crimper roller 31 to take up the slack of the relevant mechanism elements before the bias of leaf spring 41 is applied. It is contemplated that this slack motion would be in the range of ⅜ of an inch, then full spring tension of 3000 pounds would apply. Thus, the pressure on the crop passing between the rollers ranges between 450 pounds, based on the force of gravity, to the 3000 pound rating of the leaf spring, that range being absorbed in approximately ⅜ of an inch.

Figure 4:
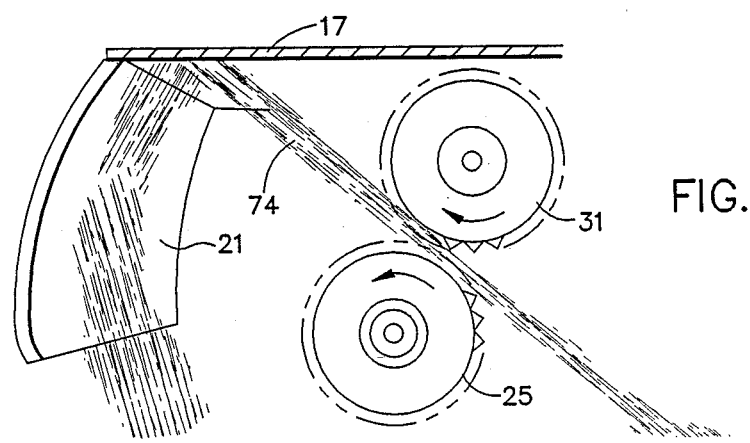
FIG. 4 is a schematic view showing the crop as it passes between the rolls and is deflected by the upper deflector plate and the mold board.

With reference to FIG. 4, it can be seen how the stream 74 of the crop being treated passes rapidly between crimper rollers 25 and 31 and is literally shot rearwardly and upwardly from the rollers. Upper horizontal deflector plate 17 is provided to redirect the stream of the crop back downwardly as can be seen in FIG. 1. Moldboard 21 then catches that stream and literally rolls the crop fully over by approximately 180° so that drying is facilitated by a combination of crimping of the stems of the crop and rolling of the windrow to expose the bottom portion of the crop to the air and sun.

Figure 5:
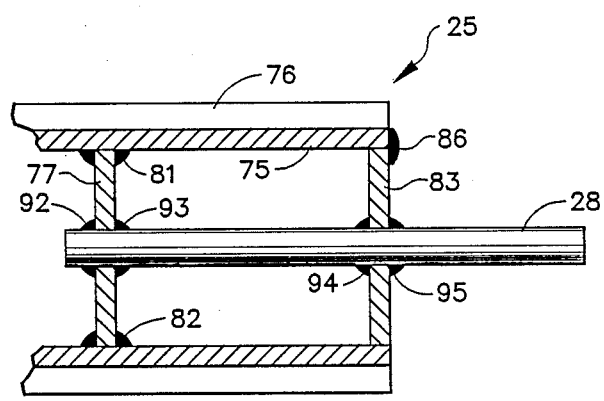
FIG. 5 is a partial sectional view through one end of one of the crimper roller members.

The stress due to the crop passing between the rollers is not only relatively large at times but it varies rapidly between zero and a large amount. This causes significant stress on the axles of the rollers, both laterally and rotationally. FIG. 5 shows how a stub axle may be made to accommodate these stresses and prevent failure of the axle with respect to the roller. A portion of roll 25 is depicted as an example in this figure. The tubular shell 75 has a plurality of angle irons 76 secured thereto such as by welding. These constitute the longitudinal teeth of the rollers. Inner plate 77, normally disc shaped with a central bore therethrough, is secured by welds 81, 82 spaced around the inner periphery of tube 75. Similarly, end plate 83 is secured by external weld 86 to securely attach it to the tubular member. Stub shaft 28 passes through the central bores in both plate 77 and 83 and is secured therein by welds 92, 93 and 94, 95 to the respective plates. By this means, there is no lateral flexing or stressing which could cause the axle or the end plate to fail either at the connection with the axle or at the connection with the tubular member. By the relatively simple expedient of adding inner plate 77, the possibility of axle failure is greatly reduced.

By way of example, rollers 25 and 31 are preferable steel pipe or tubing having a thickness of approximately 21/64" and being approximately 8 inches in diameter. The angle irons are secured to the periphery of the rollers with a gap approximately 3/16 of an inch between tooth members at the valley between each adjacent tooth. The angle irons are approximately 1¼ inches on each side and approximately ¼ inch thick. Applying simple geometry to the dimensions set out above, one can determine that each roller 25, 31 has 15 angle iron teeth on its circumferential surface. These specific examples of materials and dimensions are given by way of reference only and are not in any way to indicate a limitation of the invention.

It has been observed that prior art hay conditioners are generally limited to a crop density of approximately 2½ tons per acre. The hay conditioner of the present invention, because of its size, sturdiness and positive drive mechanism making it substantially maintenance free, can handle 5 tons per acre of hay or heavy Sudan grass. One aspect which enables this device to handle such increased crop density is the equal drive mean at both ends of the crimper rollers and the relative spacing flexibility between the rollers In view of the above description, it is likely that modifications and improvements will occur to those skilled in the art which are in the scope of the claims.

What is claimed is:

1. A crop conditioner comprising:
   a frame having a first end and a second end;
   a first crimper roller member having a first end and a second end and being rotatably mounted to said frame in fixed axial position;
   a plurality of longitudinal first teeth mounted at regularly spaced intervals to the surface of said first roller member, said first teeth being parallel to the axis of said first roller member and being substantially coextensive in length therewith;
   a second crimper roller member having a first end and a second end and being rotatably mounted to said frame;
   a plurality of longitudinal second teeth mounted at regularly spaced intervals to the surface of said second roller member, said second teeth being parallel to the axis of said second roller member and being substantially coextensive in length therewith;
   first drive means mounted at said first end of said frame;
   means for coupling said first drive means in driving engagement with said first ends of said first and second roller members;
   second drive means mounted at said second end of said frame;
   means for coupling said second drive means in driving engagement with said second ends of said first and second roller members; and
   means adapted for coupling said first and second drive means to an external source of rotary power.

2. The crop conditioner recited in claim 1, and further comprising means for permitting radial movement within predetermined limits of said second roller member with respect to said first roller member.

3. The crop conditioner recited in claim 2, wherein said first and second roller members are mounted to said frame with their respective teeth in meshing, non-engaging relationship when in the unloaded condition.

4. The crop conditioner recited in claim 3, and further comprising first and second means for independently maintaining a substantially constant bias on each of said second roller member toward said first roller member when said roller members are under load.

5. The crop conditioner recited in claim 4, wherein each said bias means comprises leaf spring means having a first end and a second end and having a predetermined rating.

6. The crop conditioner recited in claim 5, and further comprising means for maintaining the motion of said second roller member substantially radial with respect to said first roller member.

7. The crop conditioner recited in claim 6, wherein said radial motion maintaining means comprises:
   leaf spring adjusting means mounted to said frame at one end of said leaf spring means;
   a first shackle member pivotally connected to said first end of said leaf spring means and to said leaf spring adjusting means;
   a second shackle member pivotally connected to said frame and to said second end of said leaf spring means.

8. The crop conditioner recited in claim 1, wherein said first and second roller members have substantially identical diameters, the number and spacing of said first teeth on said first roller member being the same as the number and spacing of said second teeth on said second roller member.

9. The crop conditioner recited in claim 1, wherein said first teeth are generally V-shaped in cross section.

10. The crop conditioner recited in claim 1, wherein said second teeth are generally V-shaped in cross section.

11. The crop conditioner recited in claim 1, and further comprising adjustable stop means to prevent touching engagement between said first and second roller members.

12. The crop conditioner recited in claim 1, and further comprising three-point hitch means connected to said frame and adapted to detachably connect said crop conditioner to a tractor, thereby permitting said crop conditioner to be raised and lowered by means of the tractor.

13. The crop conditioner recited in claim 1, and further comprising deflector plate means mounted to said frame for fluffing and directing downwardly and rearwardly the crop after it has passed between said crimper roller members.

14. The crop conditioner recited in claim 1, and further comprising moldboard means for rolling over the crop after it has passed between said crimper roller members.

15. The crop conditioner recited in claim 14, and further comprising deflector plate means mounted to said frame for fluffing and directing downwardly and rearwardly the crop after it has passed between said crimper roller members.

16. The crop conditioner recited in claim 14, wherein said moldboard means rolls over the crop by approximately 180° after it passes through said crimper roller members.

17. The crop conditioner recited in claim 15, wherein said moldboard means rolls over the crop by approximately 180°.

18. The crop conditioner recited in claim 1, wherein said first and second driving engagement coupling means comprises:
- a first sprocket mounted on the axis of said first roller member at each end thereof;
- a second sprocket mounted on the axis of said second roller member at each end thereof;
- said rotary power source coupling means comprising a third sprocket forming part of said first driving engagement coupling means;
- said rotary power source coupling means comprising a fourth sprocket forming part of said second driving engagement coupling means; and
- first and second flexible drive chain means engaging respective said first, second and third sprockets at said first end of said frame and said first, second and fourth sprockets at said second end of said frame.

19. The crop conditioner recited in claim 18, wherein said first and second driving engagement coupling means comprises:
- a first idler sprocket mount pivotally mounted to said frame;
- a first idler sprocket rotatably coupled to said first idler sprocket mount and engaging said first flexible drive chain;
- first means to adjust said first idler sprocket mount to affect the tension of said first flexible drive chain, said first adjusting means being accessible remotely from said first drive means to permit first chain tension adjustment while said roller members are being driven by said first drive means;
- a second idler sprocket mount pivotally mounted to said frame;
- a second idler sprocket rotatably coupled to said second idler sprocket mount and engaging said second flexible drive chain; and
- second means to adjust said second idler sprocket mount to affect the tension of said second flexible drive chain, said second adjusting means being accessible remotely from said second drive means to permit second chain tension adjustment while said roller means are being driven by said second drive means.

20. The crop conditioner recited in claim 1, and further comprising means for maintaining the motion of said second roller member substantially radial with respect to said first roller member.

21. The crop conditioner recited in claim 20, wherein said radial motion maintaining means comprises:
- first roller control means mounted on said first end of said frame; and
- second roller control means mounted on said second end of said frame;
- said first and second roller control means functioning independently to enable crop conditioning to occur along the full length of said first and second roller members with different crop thickness at different locations between and along the length of said first and second roller members.

22. The crop conditioner recited in claim 3, and further comprising means for maintaining timing of said first and second drive means and said first and second roller members at all times during operation thereof so that said first and second teeth on said respective roller members are properly meshed.

23. The crop conditioner recited in claim 1, wherein said first and second crimper roller members each comprise:
- tubular member open at each end; and
- a plurality of angle irons secured in longitudinal relationship around the periphery of said tubular member thereby forming V-shaped teeth thereon.

24. The crop conditioner recited in claim 23, said roller members each further comprising:
- an end plate secured at each end of said tubular member and substantially closing each said open end, said end plate having a central bore therethrough;
- a second plate spaced axially inwardly from each said end plate and secured within said tubular member, said second plate being parallel with each said end plate and having a central bore therethrough; and
- a stub shaft fixedly mounted in said bores in said end plate and said second plate, said stub shaft extending axially outwardly from each end of each said roller member.

25. The crop conditioner recited in claim 1, wherein said rotary power source coupling means comprises:
- gear box means mounted to said frame and adapted to be coupled to external rotary power source means;
- first means for coupling said first drive means to said gear box means; and
- second means for coupling said second drive means to said gear box means.

26. For use in the crop conditioner of claims 1, a pair of roller members, each roller member comprising:
- a hollow pipe having a longitudinal axis; and
- a plurality of closely spaced but not touching angle iron members secured circumferentially around the surface of said pipe with the apex of each angle iron member being oriented away from and parallel to said axis of said roller member.

27. The roller members recited in claim 26, wherein said pipe has a diameter of eight inches, there being a gap between adjacent sides of said angle iron members on said surface of said pipe.

28. The roller members recited in claim 27, wherein said gap between adjacent angle iron members is 3/16 inch.

29. The roller members recited in claim 28, wherein there are 15 angle iron members secured around said roller surface.

30. A crop conditioner comprising:

a frame having a first end and a second end;

a first crimper roller member having a first end and a second end and being rotatably mounted to said frame in fixed axial position;

a plurality of longitudinal, generally V-shaped first teeth mounted at regularly spaced intervals to the surface of said first roller member, said first teeth being parallel to the axis of said first roller member and being substantially coextensive in length therewith;

a second crimper roller member having a first end and a second end and being rotatably mounted to said frame, the axial position of said second roller member being movable radially with respect to said first roller member within predetermined limits;

a plurality of longitudinal, generally V-shaped second teeth mounted at regularly spaced intervals to the surface of said second roller member, said second teeth being parallel to the axis of said second roller member and being substantially coextensive in length therewith, said first and second roller members being mounted to said frame with their respective teeth in meshing relationship when in the unloaded condition and with their respective first ends being mounted at said first end of said frame and with their second ends being mounted at said second end of said frame;

gear box means mounted to said frame and adapted to be coupled to external rotary power source means;

first drive means mounted at said first frame;

first means for coupling said first drive means to said gear box means;

means for coupling said first drive means in driving engagement with said first ends of said first and second roller members;

second drive means mounted at said second end of said frame;

second means for coupling said second drive means to said gear box means; and means for coupling said second drive means in driving engagement with said second ends of said first and second roller members.

* * * * *